United States Patent [19]

Nozawa et al.

[11] Patent Number: 4,757,371
[45] Date of Patent: Jul. 12, 1988

[54] STILL PICTURE TRANSMISSION APPARATUS

[75] Inventors: Toshiharu Nozawa; Shuzi Iwata, both of Amagasaki; Nobuo Fukushima, Nagasaki, all of Japan

[73] Assignee: Mitsubishi Denki Kabushiki Kaisha, Tokyo, Japan

[21] Appl. No.: 830,888

[22] Filed: Feb. 19, 1986

[30] Foreign Application Priority Data

Feb. 22, 1985 [JP] Japan .................. 60-34889

[51] Int. Cl.$^4$ .................. H04N 7/10; H04J 3/24
[52] U.S. Cl. .................. 358/86; 340/825.04; 370/95
[58] Field of Search .................. 358/86, 146, 147; 340/825.04, 825.47; 370/95; 455/4, 5

[56] References Cited

U.S. PATENT DOCUMENTS

| 4,054,911 | 10/1977 | Fletcher et al. | 358/86 X |
| 4,450,477 | 5/1984 | Lovett | 358/86 |
| 4,450,481 | 5/1984 | Dickinson | 358/86 X |
| 4,536,791 | 8/1985 | Campbell et al. | 358/86 X |

FOREIGN PATENT DOCUMENTS

| 0143160 | 6/1985 | European Pat. Off. . |
| 1423126 | 1/1976 | United Kingdom . |
| 2124856 | 2/1984 | United Kingdom . |
| 2143704 | 2/1985 | United Kingdom . |
| WO83/01181 | 5/1983 | World Int. Prop. O . |

OTHER PUBLICATIONS

CCITT ELO Book, Vol. VIII-Fascicle VIII. 2, Data Communication Networks Services and Facilities, Terminal Equipment and Interfaces, Geneva, Nov. 1980.
Microprocessor & Peripheral Handbook, Intel. Corp. 1983, pp 6-243 to 6-267.

Primary Examiner—Keith E. George
Attorney, Agent, or Firm—Birch, Stewart, Kolasch & Birch

[57] ABSTRACT

A still picture transmission apparatus in which still picture data is transmitted in packet form from a central terminal having a picture data bank selectively to a plurality of local terminals through a common transmission line at which a plurality of distinct logic channels are established, wherein a packet transmission is conducted in such a manner that a command designating a channel number is transmitted to a desired local terminal to which channel the local terminal is to be connected, and still picture data is transmitted with the use of the packet having said channel number.

2 Claims, 9 Drawing Sheets

FIG. 4.

| | transmitting channel | | | | receiving local terminal | | | | | | | | |
|---|---|---|---|---|---|---|---|---|---|---|---|---|---|
| | | | | | #1 | | #2 | | #3 | | #4 | | #5 |
| | 0 | 1 | 2 | 3 | connected channel | received data | connected channel | received data | connected channel | received data | connected channel | received data | connected channel | received data |
| 301 | — | — | — | — | 0 | — | 0 | — | 0 | — | 0 | — | 0 | — |
| 302 | CA(1,1) | — | — | — | 0,1 | CA(1,1) | 0 | CA(1,1) | 0 | CA(1,1) | 0 | CA(1,1) | 0 | CA(1,1) |
| 303 | CA(2,1) | — | — | — | 0,1 | CA(2,1) | 0,1 | CA(2,1) | 0 | CA(2,1) | 0 | CA(2,1) | 0 | CA(2,1) |
| 304 | CA(3,2) | — | — | — | 0,1 | CA(3,2) | 0,1 | CA(3,2) | 0,2 | CA(3,2) | 0 | CA(3,2) | 0 | CA(3,2) |
| 305 | CA(4,3) | — | — | — | 0,1 | CA(4,3) | 0,1 | CA(4,3) | 0,2 | CA(4,3) | 0,3 | CA(4,3) | 0 | CA(4,3) |
| 306 | CA(5,1) | — | — | — | 0,1 | CA(5,1) | 0,1 | CA(5,1) | 0,2 | CA(5,1) | 0,3 | CA(5,1) | 0,1 | CA(5,1) |
| 307 | — | TXA | — | — | 0,1 | TXA | 0,1 | TXA | 0,2 | — | 0,3 | — | 0,1 | TXA |
| 308 | — | — | TXB | — | 0,1 | — | 0,1 | — | 0,2 | TXB | 0,3 | — | 0,1 | — |
| 309 | — | — | — | TXC | 0,1 | — | 0,1 | — | 0,2 | — | 0,3 | TXC | 0,1 | — |
| 310 | TXD | — | — | — | 0,1 | TXD | 0,1 | TXD | 0,2 | TXD | 0,3 | TXD | 0,1 | TXD |
| 311 | — | CA(3) | — | — | 0,3 | CA(3) | 0,3 | CA(3) | 0,2 | — | 0,3 | — | 0,3 | CA(3) |
| 312 | — | — | — | TXE | 0,3 | TXE | 0,3 | TXE | 0,2 | TXE | 0,3 | TXE | 0,3 | TXE |

STILL PICTURE TRANSMISSION APPARATUS

FIELD OF THE INVENTION

The present invention relates to a still picture transmission apparatus capable of conducting a so-called group multiple address efficiently, that is, a transmission of the same picture data to a plurality of desired terminals at the same time in a network comprising a central terminal having a picture data bank (hereinafter referred to as "center") and a plurality of local terminals connected to the center through a single common transmission line (including space transmission).

BACKGROUND OF THE INVENTION

Conventionally, a group multiple address in a network comprising a center and a plurality of local terminals connected thereto through a single common transmission line such as in an LAN (local area network) or a CATV (community antenna television) is conducted in such a manner that the center sends out data with a group address (representation address) which is predetermined for each group of the local terminals as its transmission destination address, and the local terminal receives the data including the group address of that group to which the terminal belongs.

The operation of the group multiple address will be described with the use of a network shown in FIG. 5:

In FIG. 5, the reference numeral 100 designates a center having a picture data bank, constituted by a device such as a mini-computer, and the picture data is stored in the external memory device thereof. The reference numerals 101 to 105 designate local terminals connected to the center 100 through a single common transmission line 106, which terminals are intended to receive (and decode) the data sent from the center 100 thereby to display the same on a display. Hardware for exclusive use or a personal computer may be used as the local terminal. The local terminals 101 to 105 have terminal addresses of #1 to #5, respectively, and the local terminals 101, 102, and 105 have a group address of #100, the terminal 103 a group address of #101, and the terminal 104 a group address of #102, respectively.

The still picture data is transmitted in a packet form shown in FIG. 6. The packet comprises a header section 201 and a data section 202. The header section 201 includes an address field 204 for containing an address designating a transmission destination, which address is intended to make only the local terminal of that address receive this packet.

The manner of transmission will be described with reference to FIG. 7:

At first in a usual transmission, when the data TXA is transmitted with the transmission destination address #1, only the local terminal of address #1 receives the data TXA (refer to 400 in FIG. 7). Similarly as above when the data TXB, TXC, TXD, TXE are transmitted with the transmission destination address #2, #3, #4, and #5, only the local terminals #2, #3, #4 and #5 receive the data TXB, TXC, TXD, and TXE, respectively (refer to 401 to 404).

Nextly, when the data TXF is transmitted with the group address #100, that data TXF is received by the local terminals #1, #2, and #5 having a group address of #100, realizing a group multiple address (refer to 405). However, in this method, when the multiple address group should be changed, for example, into such that the data TXG should be multiple addressed to the local terminals of #1, #2, #4, and #5, the following operation must be conducted: The data TXG is, at first, sent out to the local terminal #4 (refer to 406), and the data TXG is again sent out with the group address #100, thereby to multiple address the local terminals #1, #2, and #5 (refer to 407).

In the prior art still picture transmission apparatus under such a construction, a group address must be predetermined in conducting a group multiple address, and therefore it was impossible to change the group of the local terminals in the midst of system operation.

SUMMARY OF THE INVENTION

The present invention is directed to solve the problems pointed out above, and has for its object to provide a still picture transmission apparatus capable of conducting a grouping of local terminals dynamically, and also conducting a multiple address efficiently.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a still picture transmission apparatus in which still picture data is transmitted in packet form from the central terminal having a picture data bank selectively to a plurality of local terminals through a common transmission line at which a plurality of logic channels are established, wherein a packet transmission is conducted in such a manner that a command designating a channel number is transmitted to a desired local terminal to which channel the local terminal is to be connected, and a still picture data is transmitted with the use of the packet having said channel number.

BRIEF DESCRIPTION OF THE DRAWINGS

FIG. 4 is a diagram showing the manner of transmission at the group multiple address in the apparatus of FIG. 1;

DETAILED DESCRIPTION OF THE PREFERRED EMBODIMENTS

Figure 1:
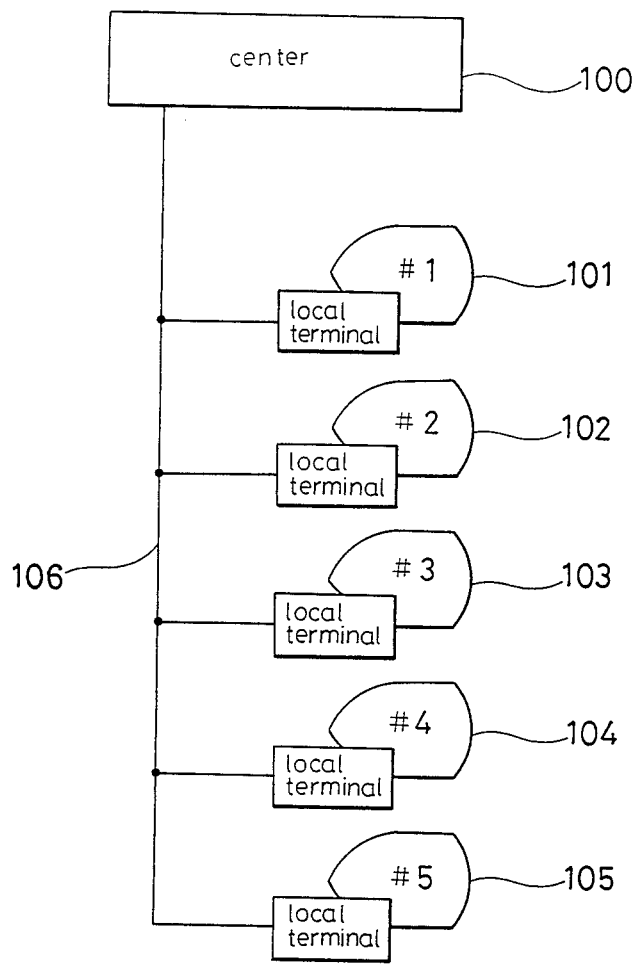
FIG. 1 is a block diagram showing a still picture transmission apparatus as an embodiment of the present invention.

In order to explain the present invention in detail, reference will be particularly made to FIG. 1;

In FIG. 1, the reference numeral 100 designates a center (central terminal), the numerals 101 to 105 designate local terminals which are connected to the center 100 through a single common transmission line 106 at which a plurality of logic channels can be established. The local terminals 101 to 105 have terminal addresses of #1 to #5, respectively.

In this embodiment, the center 100 is intended to transmit to a desired local terminal a command designating a channel number to which channel the local terminal should be connected, and to transmit still picture data in a packet form having the channel number while transmitting packets selectively to a plurality of terminals. Each local terminal has only a terminal address, and does not have a group address.

In the above embodiment only five local terminals are provided for simplification, but the number of the terminals is not limited thereto.

Figure 2:
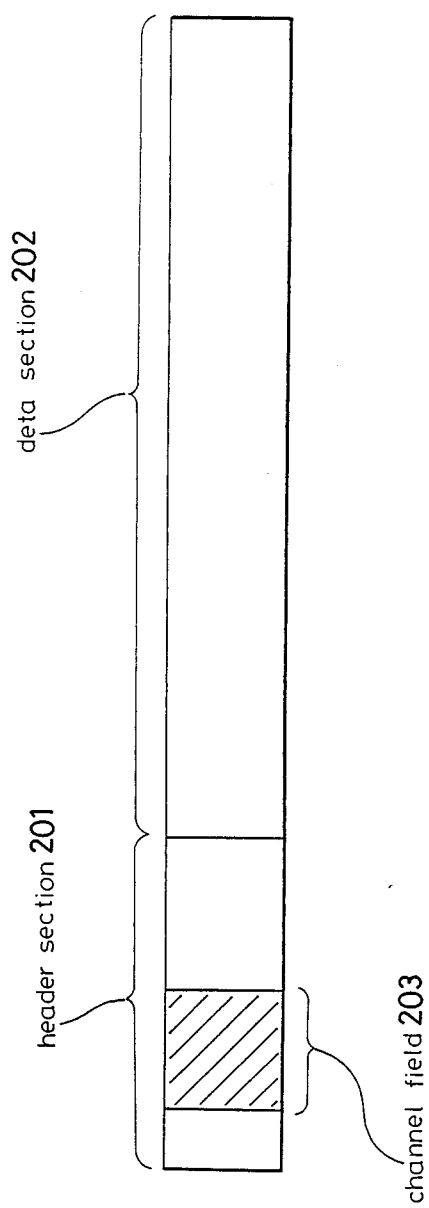
FIG. 2 is a diagram showing a format of a transmission packet in the apparatus of FIG. 1.

The data transmitted on the transmission line 106 has a packet structure shown in FIG. 2. The packet has a header section 201 and a data section 202, and the header section 201 has a channel field 203. The channel field 203 is provided for containing the value of the logic channel through which the packet is transmitted, which value is intended to acknowledge the local terminal which logic channel each packet belongs to. Thus, a plurality of logic channels can be established on a single common transmission line.

In the next place, the following command is defined as a command to be transmitted to the local terminal from the center.

CA(n, m): to connect the channel m to the local terminal of terminal address n.

Figure 3:
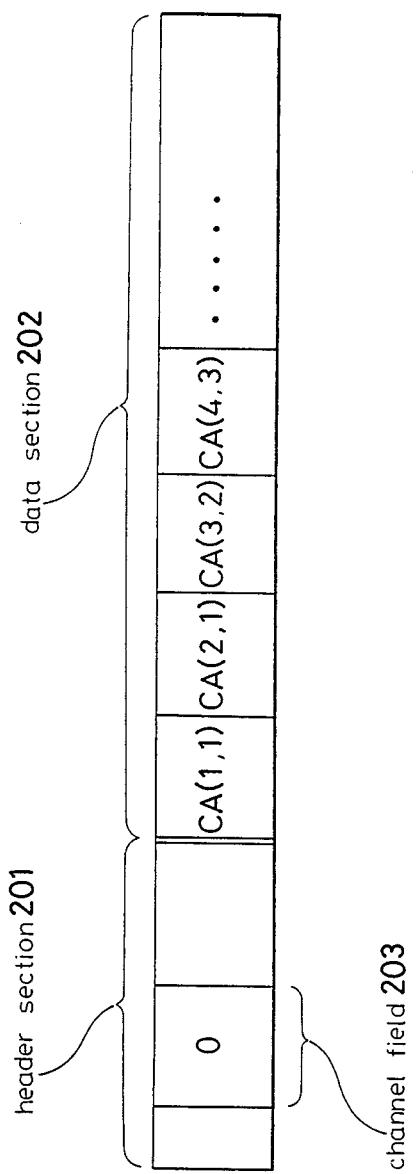
FIG. 3 is a diagram showing a transmission format of a command in the apparatus of FIG. 1.
Figure 5:
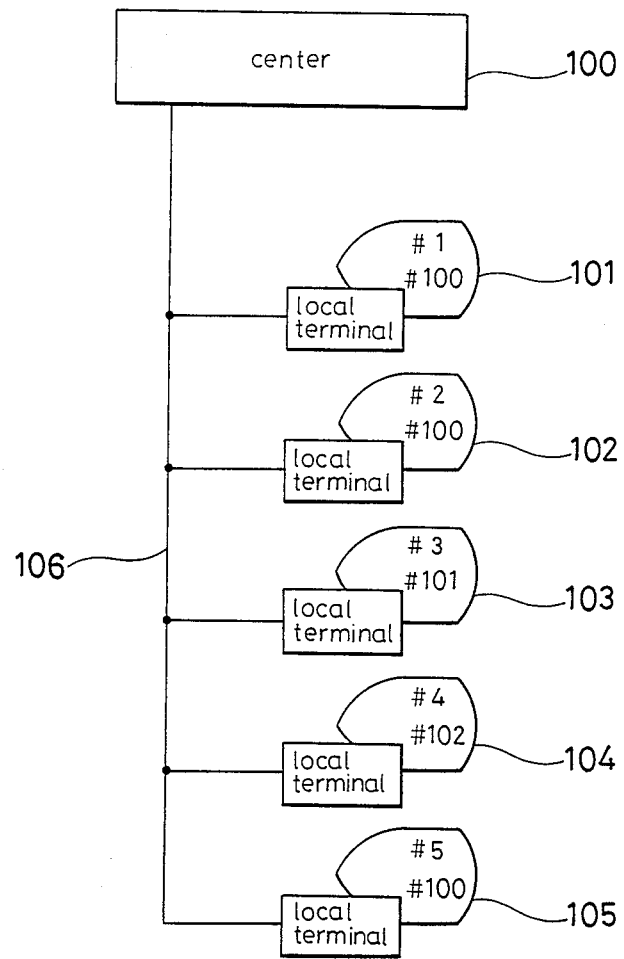
FIG. 5 is a diagram showing the prior art still picture transmission apparatus.
Figure 6:
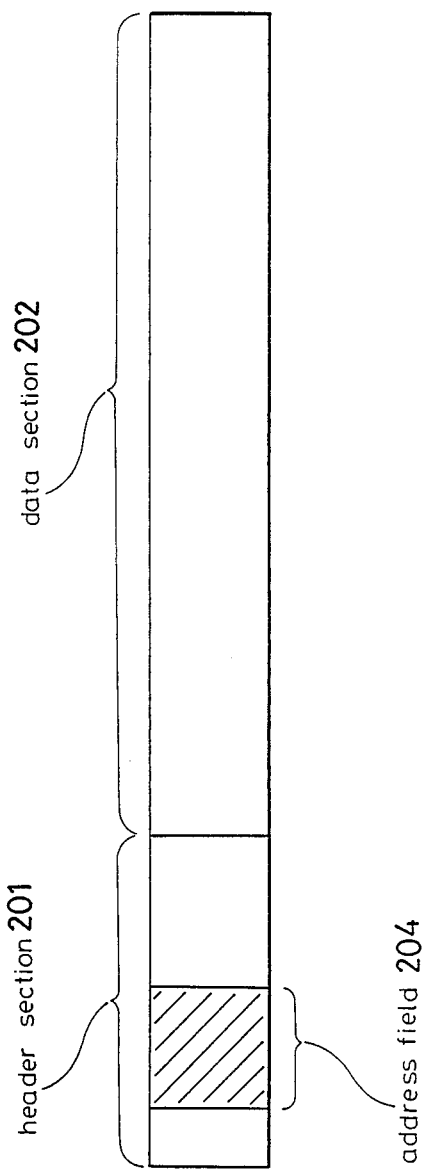
FIG. 6 is a diagram showing a transmission format of a transmission packet in the apparatus of FIG. 5.
Figure 7:
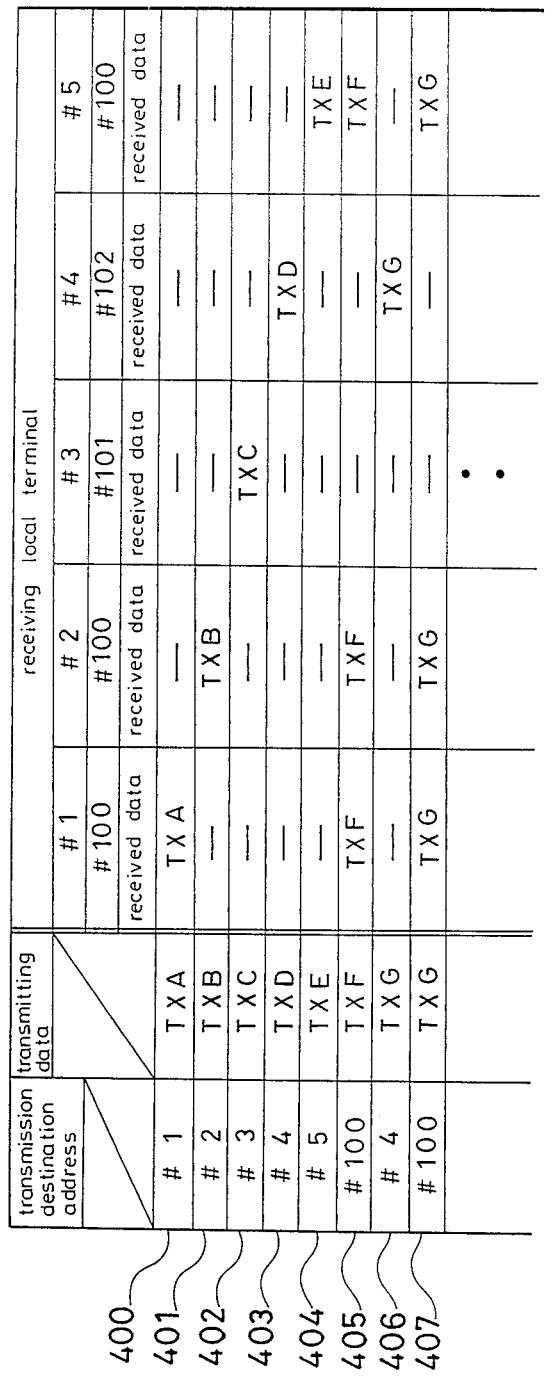
FIG. 7 is a diagram showing the manner of transmission at the group multiple address in the apparatus of FIG. 5.

When the local terminal of terminal address n receives this command, the local terminal receives and decodes the data transmitted through the channel m, that is, only the packet having the value m in the channel field. When n is abbreviated in the designation of the command C(n, m), all the local terminals which have received this command will be connected to the channel m. The command is actually transmitted and included in the data section 202 of the packet shown in FIG. 3.

The operation of the group multiple address of this embodiment will be described with reference to FIG. 4:

At first the channels 0, that is, the common channels in all the local terminals are connected to each other (refer to 301). Next when the command CA(1,1) is transmitted from the center 100 through the channel 0, al the local terminals receive and decode the same, and only the channel 1 is connected to the local terminal #1, and the other terminals keep the previous state (refer to 302). Thereafter, the local terminal #1 receives the data from the channel 0 and the channel 1. Similarly as above, the commands CA(2, 1), CA(3, 2), CA(4, 3), and CA(5, 1) are transmitted through the channel 0, whereby the channel 1 is connected to the local terminal #2, the channel 2 to the terminal #3, the channel 3 to the terminal #4, and the channel 1 to the terminal #5, respectively (refer to 303 to 306). Thus the local terminals #1, #2, and #5 constitute a group of terminals which receive a multiple address. Herein, if the data TXA is transmitted through the channel 1, then the data TXA is received by the local terminals #1, #2, and #5 at the same time, and a group multiple address is realized (refer to 307). When the data TXB is transmitted through the channel 2, the data TXB is received only by the local terminal #3 (refer to 308), and similarly as above when the data TXC is transmitted through the channel 3, the data TXC is received only by the local terminal #4 (refer to 309). Furthermore, when the data TSD is transmitted through the channel 0 which is a common channel, the data TXD is received by all the local terminals #1 to #5 (refer to 310).

Nextly when the command CA(3) is transmitted through the channel 1, the channel which is to be connected to the local terminals #1, #2, and #5 which have just received this command is changed from channel 1 to channel 3 (refer to 311), whereby the group of terminals which receive the multiple address is changed to one including the local terminals #1, #2, #4, and #5. Therefore, it is possible to conduct a group multiple address of the data TXE to the local terminals #1, #2, #4, and #5 by transmitting the data TXC to the channel 3 (refer to 312).

The local terminal may be any type one which is capable of receiving packet information. An example of construction using a communication oriented LSI is shown in FIG. 8.

Figure 8:
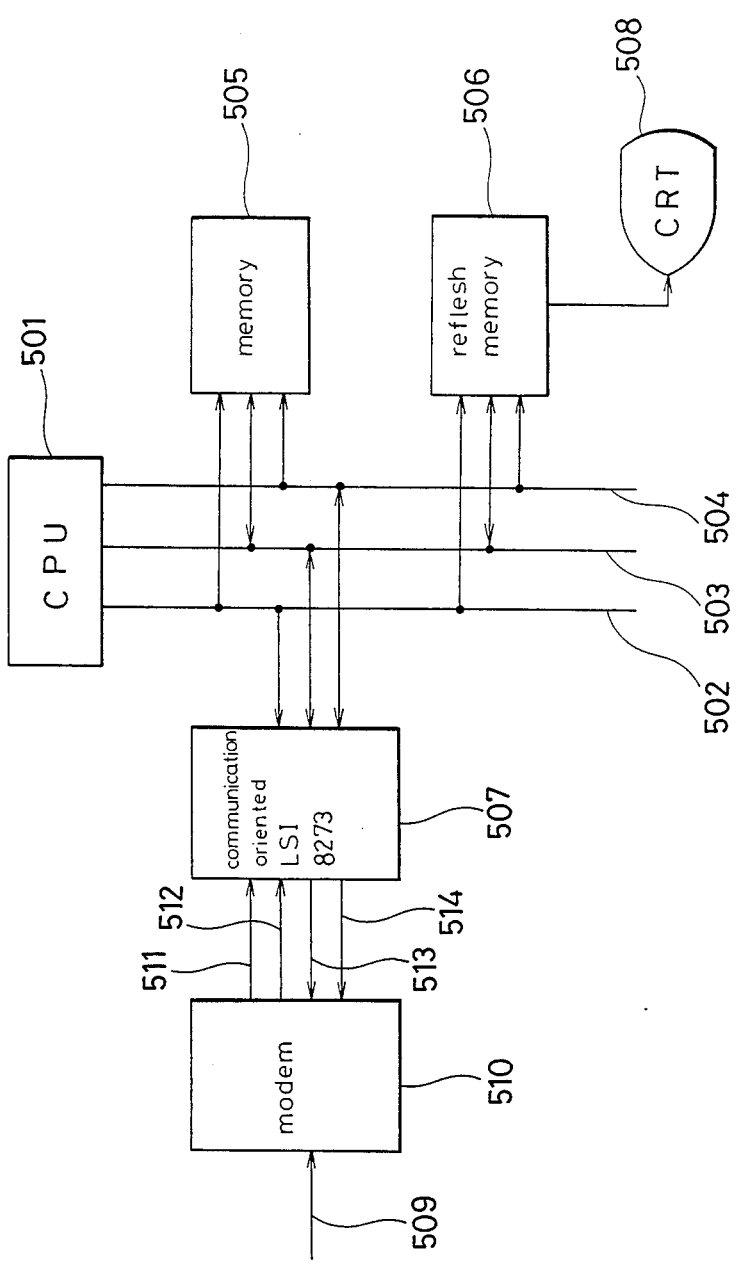
FIG. 8 is a block diagram illustrating an example of a local terminal.

In FIG. 8 the reference numeral 501 designates a CPU for controlling the whole of the local terminal, and it is combined with a system memory 505, a refresh memory for displaying pictures 506, and a communication oriented LSI 507 by means of an address bus 502, a data bus 503, and a control bus 504. The picture written into the refresh memory 506 is displayed on the CRT display 508. The data transmitted from the center through the transmission line 509 is demodulated by the modem 510, and the received data 511 and the received clock 512 are sent to the LSI 507. On the contrary, when the transmission data 513 and the transmission clock 514 are given to the modem 510 from the LSI, the modem 510 modulates the same to send it out to the transmission line. As the communication oriented LSI 507, a Programmable HDLC/SDLC Protocol Controller 8273 made by Intel Corporation can be used. This controller 8273 is designed to conduct a packet transmission regulated by CCITT as X.25 (HDLC). Refer to the literature "Microprocessor and Peripheral Handbook: Intel Corporation 1982" as to the detail of the controller 8273.

Figure 9:
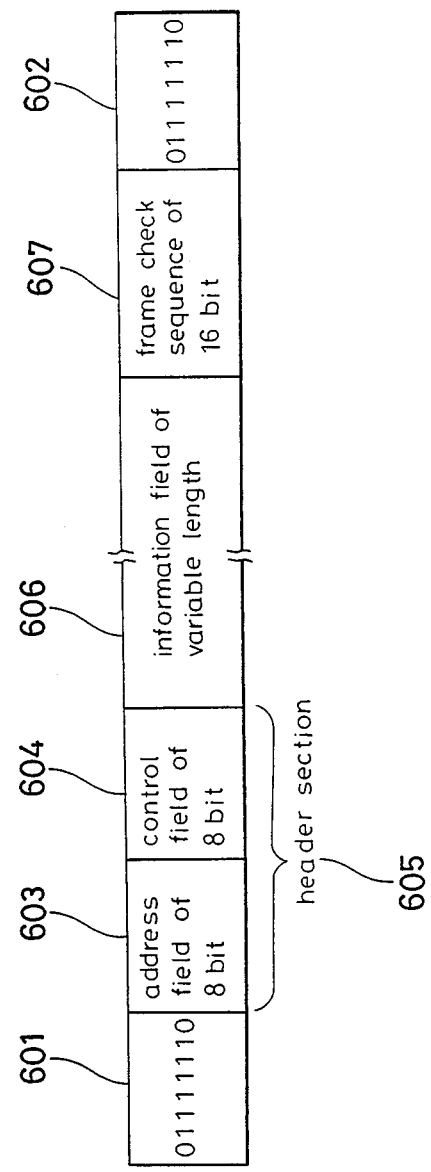
FIG. 9 illustrates an example of a packet of information transmitted from the local terminal of FIG. 8.

The packet format of X.25 is shown in FIG. 9. The packet is located sandwiched between by the opening flag 601 and the closing flag 602. Both the opening flag 601 and the closing flag 602 have a bit pattern of 01111110. The packet comprises a header section 605 comprising an address field 603 and a control field 604, and an information field 606 which comprises a bit series of transmission information, and a frame check sequence 607 as an additional bit for error detection. In the usual procedure of X.25 the center is designed to conduct a transmission with designating the terminal address by the contact of the address field 603. The controller 8273 (507) is intended to detect the content of the address field 603, and to provide an interrupt intrude to the CPU 501 through the control bus 504 thereby to notify the reception of the packet when the content of the address field coincides with the local terminal address previously programmed by the CPU 501. When the address does not coincide, an interrupt does not occur. In this way it is possible to transmit data only to the local terminal having the address designated. Furthermore, it is possible to programmably store two values as the address to be detected in the controller 8273, and then an interrupt occurs when either of the two is detected.

On the contrary in this embodiment the address field 603 is used as a channel field so as to show the logic channel through which the packet is transmitted. The CPU 501 programmably stores the number 0 of the common channel and the number m of the channel designated by the above described command CA(n, m) in the controller 8273 (507) as the address to be detected by the controller 8273 (507). Thus the controller 8273 (507) generates an interrupt thereby to notify the same to the CPU 501 only when it receives a packet of the designated channel.

As described above, according to the present invention, a plurality of logic channels are established on a single common transmission line, and a command indicating the number of logic channels which are to be connected to a desired local terminal is transmitted included in a packet. Such a system enables a simultaneous multiple addressing, a group multiple addressing, and a grouping of multiple address groups easily and efficiently.

What is claimed is:

1. A system for transmitting picture data in packet form, each packet containing a data section including said picture data and a head section including channel address data, comprising:

a central terminal for transmitting said picture data and for transmitting commands in packet form over a transmission line;

a plurality of local terminals connected to said transmission line and receiving preselected transmitted picture data and commands, each of said plurality of local terminals having a specific address; and a plurality of logic channels, each identified by a channel address through which said picture data and commands are transmitted from said central terminal to said local terminals over said transmission line, each logic channel formed by packets each of which includes the channel address for that logic channel in the head section channel address data, all of said plurality of local terminals being receptive to a common channel;

said central terminal including transmitter means for transmitting commands through said common channel enabling predetermined ones of said local terminals to be additionally receptive to another channel, such that predetermined groups of said plurality of local terminals are dynamically selected to receive particular picture data and commands through said logic channels.

2. A method for transmitting picture data in packet from, each packet containing a data section including said picture data and a header section including channel address data, comprising the steps of:

providing a plurality of logic channels each identified by a channel address through which picture data and commands are transmitted over a transmission line between a central terminal and a plurality of local terminals, each logic channel formed by data packets each of which includes the channel address for that logic channel in the header section channel address data;

designating a common channel to which all local terminals are receptive;

transmitting commands through said common channel enabling predetermined ones of said plurality of local terminals to be additionally receptive to another channel;

transmitting picture data through said channels to predetermined groups of said plurality of local terminals selected by said commands; and transmitting commands through said channels to alter the constituency of said predetermined groups.

* * * * *